No. 721,890. PATENTED MAR. 3, 1903.
M. HENIUS.
CONVERTIBLE MASH TUN AND WORT SEPARATOR.
APPLICATION FILED OCT. 18, 1902.
NO MODEL. 2 SHEETS—SHEET 1.

Witnesses:
John Enders Jr.
Geo. C. Davison

Inventor:
Max Henius,
By Dyrenforth, Dyrenforth & Lee,
Attys

No. 721,890. PATENTED MAR. 3, 1903.
M. HENIUS.
CONVERTIBLE MASH TUN AND WORT SEPARATOR.
APPLICATION FILED OCT. 18, 1902.
NO MODEL. 2 SHEETS—SHEET 2.

UNITED STATES PATENT OFFICE.

MAX HENIUS, OF CHICAGO, ILLINOIS.

CONVERTIBLE MASH-TUN AND WORT-SEPARATOR.

SPECIFICATION forming part of Letters Patent No. 721,890, dated March 3, 1903.

Application filed October 18, 1902. Serial No. 127,843. (No model.)

*To all whom it may concern:*

Be it known that I, MAX HENIUS, a citizen of the United States, residing at Chicago, in the county of Cook and State of Illinois, have invented a new and useful Improvement in Convertible Mash-Tuns and Wort-Separators, of which the following is a specification.

My invention relates to an improvement in the class of apparatus employed in the art of brewing and technically known as a "mash-tun," the ordinarily-used form of which is, generally stated, a vessel having a bottom discharge-outlet for the wort filtered into it through the sediment from the mash and through a strainer upon which the sediment precipitates. While a mash-tun involving the construction thus outlined affords, in a sense, a convertible mash-tun and wort-separator, it is defective for use in separating the wort from the mash, inasmuch as the strainer is permanently on the bottom of the vessel, so that its openings become more or less clogged in the mashing operation with grains from the mash, with the result that the outflow of the wort in separating it is sluggish and consumes an undue amount of time to accomplish the separation.

The primary object of my improvement is to provide a construction of the mashing vessel whereby the position of its strainer may, during the mashing period, be above the level of the material undergoing the mashing operation, where it will be inaccessible to the grains or to any portion of the mash that would tend to clog it and will therefore present a clear strainer to the mash when presented to the latter for separating from it the wort.

To this end my invention consists, in its broadest sense, in providing the mash-tun in the form of a vessel having a strainer-covered opening in its wall and containing a rotatable stirrer and supported to adapt it to be rotated or turned on its bearings for the purpose of bringing the strainer-covered opening uppermost or above the mash, to be maintained in that position during the mashing operation, and of bringing that opening lowermost or below the mash, to be maintained in that position during the wort-separating operation for causing the wort to strain from the mash.

My invention also consists in details of construction and combinations of parts, all as hereinafter more particularly described, and set forth in the claims.

Figure 1:
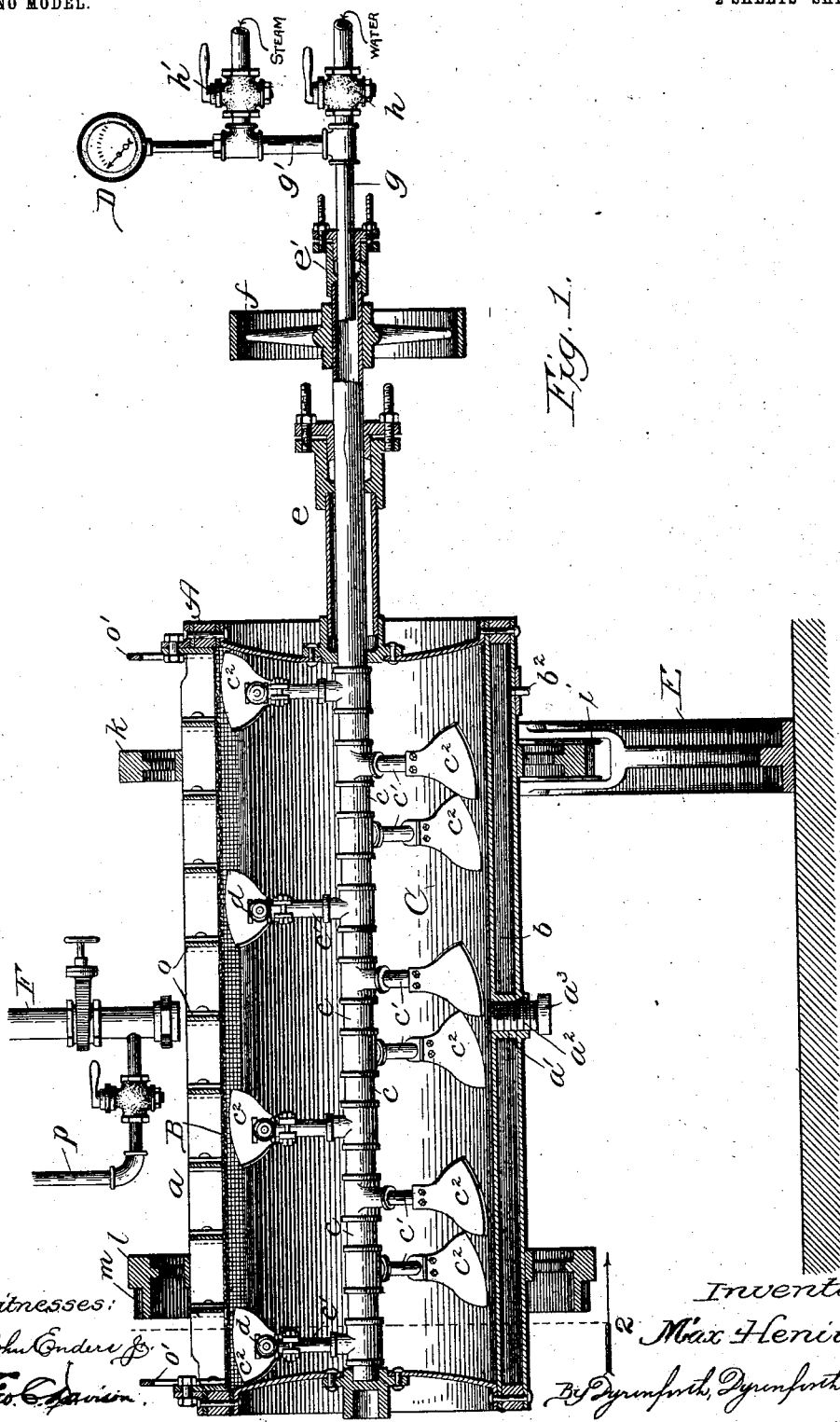
Figure 2:
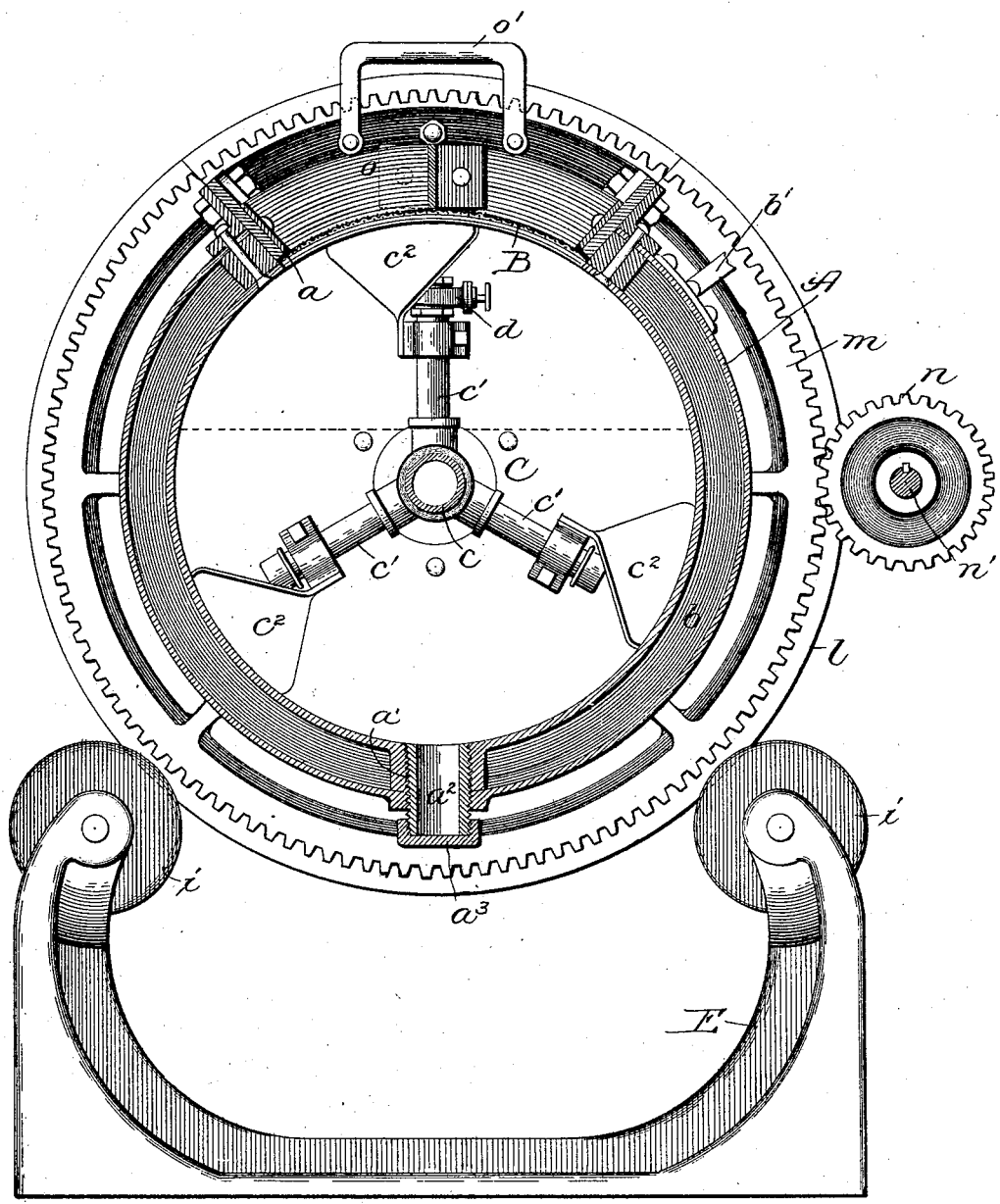

Referring to the accompanying drawings, Figure 1 represents my improved apparatus by a view in vertical longitudinal sectional elevation; and Fig. 2 is a view of the same in cross-sectional elevation, the section being taken at the line 2 on Fig. 1 viewed in the direction of the arrow and enlarged.

A is a vessel shown in its preferred cylindrical form with a rectangular opening $a$ in its wall covered by a removable strainer B and surrounded, by preference, by a steam-jacket $b$, extending between the sides of the opening $a$ and provided with inlet and outlet pipes $b'$ $b^2$.

C is the stirrer, comprising a hollow shaft $c$, journaled to rotate in the opposite heads of the vessel, lengthwise through which it extends centrally, and which may be formed of coupled sections, as indicated, provided, to extend at right angles from them, with stirrers formed of tubular arms $c'$ communicating with the interior of the shaft and carrying at their outer ends stirrer-blades $c^2$. Three longitudinal series of these stirrer-arms are shown one hundred and twenty degrees apart, which is the preferred arrangement, and each tubular arm in one series is provided in its outer end with a check-valve (indicated at $d$) for a purpose hereinafter described, while the arms of each of the other series are capped at their outer ends to seal them. In the wall of the vessel opposite the strainer-opening $a$ is provided an opening $a'$, leading through the jacket $b$ and containing a threaded nozzle $a^2$, provided with a removable cap $a^3$. Where the stirrer-shaft projects through a vessel-head it is equipped, as shown, with a suitable stuffing-box $e$, beyond which it carries a belt-pulley $f$ for driving it, and the outer end of the shaft has connected with it at a stuffing-box $e'$ an inlet-pipe $g$ for water, the supply of which is controllable by a faucet $h$, and steam, the supply of which is controllable by a faucet $h'$, connected with a branch pipe $g'$, surmounted by a steam-gage D. Near each end of the vessel is provided a bearing for its rotatable support comprising a stand E, shown of yoke-shape, having antifriction-wheels $i$ $i$ journaled in the ends of its arms, on which the cylinder A rests at bearing-rings $k$ and $l$, surrounding it, respectively, near its opposite ends, the ring $l$ carrying a cog-wheel $m$, engaged by a driving-pinion $n$, suitably supported on a drive-shaft $n'$.

It is desirable that the strainer B shall be removable from its position in the vessel A to permit the use of the opening $a$ for introduction into the mash-tun of the materials of the mash. Accordingly the strainer is rendered removable and replaceable, and to that end has the perforated strainer material or strainer proper fastened to the base of a substantial frame $o$, provided with handles $o'$, by means of which to manipulate it, the sides of the frame being bolted to the framework about the opening $a$. In order to avoid obstruction against removal of the strainer, the bearing-rings of the vessel where they cross the strainer are formed as separate sections, as shown in Fig. 2, of the ring $l$ and the gear $m$ formed as a part of it.

To use my improved apparatus, the procedure is as follows: With the vessel in the position illustrated, wherein the opening $a$ is uppermost, and with the strainer removed the materials for the mash are introduced through the opening $a$, and the shaft $c$ is rotated to effect the required stirring of the materials until the mash is completed. The illustrated construction of the apparatus adapts it to have the water for the mash and live steam for maintaining it at the desired temperature introduced from the pipe $g$ through the hollow stirrer - shaft and the valve-equipped arms $c'$ into the vessel, and these particular arms are provided with check-valves to prevent entrance in them while rotating, and consequently also into the hollow shaft, of the material being stirred. It is not essential to my invention, however, that the steam and water shall be thus introduced, for the water may be supplied otherwise and the mash may be heated by steam introduced into the jacket $b$, and the hollow shaft and arms may be employed for another purpose, hereinafter described, though it is not essential to my invention either that the rotary shaft or the stirring-arms shall be hollow, although their hollow form is advantageous, since it enables the influence of steam and water passed through them to be directly exerted beyond the plane of the shaft.

After the mash is completed in the vessel A or preliminary to or during the mashing procedure the strainer B is applied and secured in its position of covering the opening $a$. Thereupon the stirrer is stopped, with the valved arms projecting upward, and the pinion $n$ is actuated to turn the vessel on its bearings to bring the strainer lowermost, whereby the opening $a'$, if provided, (though it is not indispensable,) may be brought coincident with a valve-equipped supply-pipe F, serving a purpose hereinafter described and shown, to have connected with it below its valve a valved pipe $p$ for introducing compressed air into the vessel. After thus turning the vessel the nozzle $a^2$, upon removing its cap $a^3$, is coupled to the pipe F. With the strainer at the bottom of the overturned vessel, the wort separates from the mash and is strained through the strainer into any suitable receptacle (not shown) for further treatment by boiling and hopping it. The overturning of the mash-tun thus converts it into a wort-separator, presenting a clear or unclogged strainer for the separation, since no mashing was performed upon it to clog it with material from the mash by reason of its position being above or away from the material in the vessel during the mashing operation. During the outflow of the wort the discharge may be materially assisted by air-pressure introduced from the pipe $p$ upon the contents of the vessel.

After the wort separation has taken place the wort, including the product of the usual sparging, is hopped in ordinary or any suitable manner. Meantime after uncoupling and capping the nozzle $a^2$ the vessel A is turned back to bring uppermost the strainer, which is removed to free the opening $a$, and thereafter the vessel is again turned to bring the opening $a$ lowermost to dump the residue of the mash, when the vessel should be carefully cleaned by rinsing to prepare it for receiving the hopped wort. For this purpose, furthermore, the strainer B is replaced upon again turning the vessel to facilitate the replacement to bring the opening $a$ uppermost, and then the vessel is turned back to bring the strainer at the bottom, and upon coupling together the nozzle $a^2$ and pipe F the hopped wort containing the hops is run into the vessel and the wort separates from the hops through the strainer and is collected for further treatment in the manufacture of beer.

After the vessel A has been cleaned by dumping the residue of wort separation from the hops and rinsing it in the manner described of cleaning it for the reception of the hopped wort the apparatus is again ready for mashing and separating the wort.

What I claim as new, and desire to secure by Letters Patent, is—

1. A convertible mash-tun and wort-separator consisting of a rotatably-supported vessel having in its otherwise imperforate wall a strainer-covered opening normally uppermost whereby to retain the contents during the mashing operation, said vessel being invertible to bring the strainer-covered opening lowermost whereby to strain the wort, and means effecting the stirring of the contents of the vessel.

2. A convertible mash-tun and wort-separator consisting of a vessel having in its otherwise imperforate wall an opening normally uppermost whereby to retain the contents during the mashing operation, a removable strainer-covering at said opening, means enabling the inversion of the vessel to bring the strainer-covered opening lowermost whereby to strain the wort, and stirring means in said vessel.

3. A convertible mash-tun and wort-separator consisting of a vessel having in its otherwise imperforate wall a strainer-covered opening normally uppermost whereby to retain the contents during the mashing operation, means enabling the inversion of the vessel to bring the strainer-covered opening lowermost whereby to strain the wort, an inlet-opening in the vessel-wall for connection with a supply-pipe, and a stirrer-shaft rotatably mounted in the vessel and carrying stirrers.

4. A convertible mash-tun and wort-separator consisting of a vessel having in its otherwise imperforate wall a strainer-covered opening normally uppermost whereby to retain the contents during the mashing operation, means enabling the inversion of the vessel to bring the strainer-covered opening lowermost whereby to strain the wort, and a stirrer comprising a hollow shaft rotatably mounted in the vessel and having a series of blade-carrying hollow stirrer-arms.

5. A convertible mash-tun and wort-separator consisting of a vessel having in its otherwise imperforate wall a strainer-covered opening normally uppermost whereby to retain the contents during the mashing operation, means enabling the inversion of the vessel to bring the strainer-covered opening lowermost whereby to strain the wort, and a stirrer comprising a hollow shaft rotatably mounted in the vessel and having a series of blade-carrying hollow stirrer-arms and check-valves.

6. A convertible mash-tun and wort-separator consisting of a vessel having in its otherwise imperforate wall a strainer-covered opening normally uppermost whereby to retain the contents during the mashing operation, bearing-rings and a cog-gear surrounding said vessel and divided at the opening, an inlet-opening in the vessel-wall for connection with a supply-pipe, a hollow stirrer-shaft mounted in the vessel and provided with a series of blade-carrying hollow stirrer-arms, a support for said vessel having antifriction bearing-rollers upon which the vessel rests at said rings, and a drive-shaft carrying a pinion engaging said cog-wheel to rotate the vessel on its bearings and bring the strainer-covered opening lowermost whereby to strain the wort.

MAX HENIUS.

In presence of—
L. HEISLAR,
ALBERT D. BACCI.